United States Patent Office.

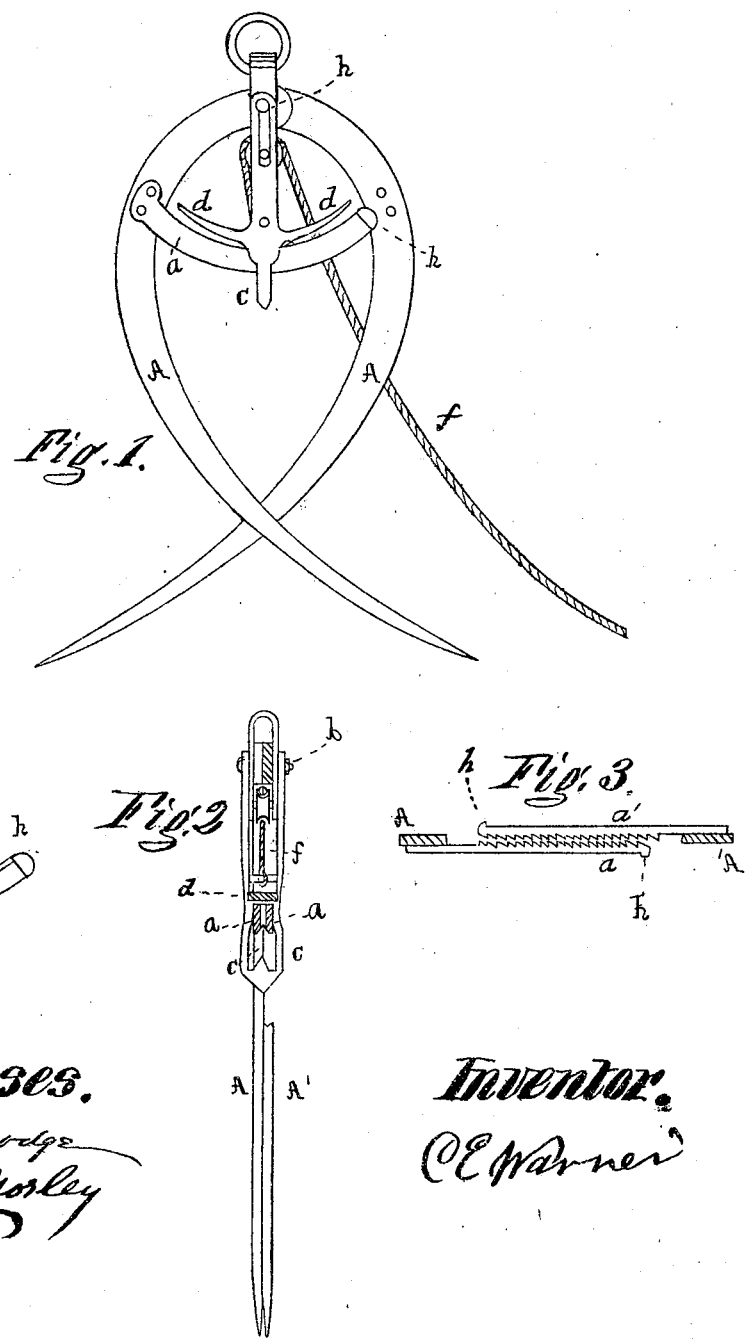

CHAUNCEY E. WARNER, OF SYRACUSE, NEW YORK.

Letters Patent No. 96,173, dated October 26, 1869; antedated October 16, 1869.

IMPROVEMENT IN HORSE HAY-FORKS.

The Schedule referred to in these Letters Patent and making part of the same.

*To all whom it may concern:*

Be it known that I, CHAUNCEY E. WARNER, of Syracuse, in the county of Onondaga, and State of New York, have invented a new and useful Improvement in Horse Hay-Forks; and I do hereby declare that the following is a full, clear, and exact description thereof, which will enable those skilled in the art to make and use the same, reference being had to the accompanying drawings, forming part of this specification, in which—

Figure 1 is a side view of my improvement, and
Figure 2 is a sectional edge view.
Figure 3 is a top view of the locking-segments, and
Figure 4 shows a modification in the locking-parts which secure said segments to each other.

Similar letters of reference indicate like parts in all the figures.

The fork has two curved tines, A A', which enter the hay in a circular direction, as the fork is pressed in, so that the tines stand in about the position shown in fig. 1, when they are fully engaged with the hay.

The lock is formed by two toothed segments, $a$ and $a'$, one of which is fixed to the tine A, and the other to the tine A', the said segments being arranged concentrically with the pivot $b$, and are made to engage with each other, to secure the tines in the loaded position, by a loop, C, which is extended upward, so as to be suspended from the main pivot $b$, and in such manner as to slide vertically thereon.

In the position shown, the loop C is holding the toothed segments $a$ $a'$ engaged with each other; but, by pulling on the discharging-cord $f$, the loop is elevated, so that the segments $a$ $a'$ occupy the lower portion of loop C, which is sufficiently roomy (see fig. 2) to allow the segments to move apart, and disengage.

The disengagement of the segments is insured, when the loop C is raised, by a wedge-shaped projection, $c$, fig. 2, in the lower portion of the loop, which enters a V-groove formed between the lower edges of the segments, and forces said segments to disengage with each other, and holds them apart, so that their teeth cannot catch, and wear upon each other, while the fork is being opened or closed.

The loop C has two arms, $d\,d$, fig 1; and, when the operator wishes to close the lock, he places his hands upon the said arms $d\,d$, and pushes the loop C down, and the segments $a\,a'$ are made to engage with each other, thereby being forced together by the narrow portion of the loop C, as it is forced down upon them.

The arms $d\,d$ also act as stops, to prevent the tines A A' from closing beyond a certain point, the said tines striking upon the ends of these arms $d\,d$.

Upon the end of each segment $a$ is a stop or projection, $h$, which prevents the fork from being opened too far, by said stops coming in contact with the loop C.

The segments $a\,a'$ can be made to engage with each other, to lock the fork, by a jaw hinged to one of the segments, as shown in fig. 4, in place of the vertically-sliding loop C, said jaw having a handle, to close it, and being raised by a cord, $f$, to discharge the fork, the same as when the loop is used. I, however, consider the sliding loop as preferable, as the segments are kept clear of each other when disengaged, and all grating and wear of the teeth against each other are avoided.

Having thus described my invention,
What I claim as new, and desire to secure by Letters Patent, is—

1. In connection with the curved tines A A', the toothed segments $a\,a'$ and vertically-sliding loop C $c$ $d\,d$, all constructed and operating substantially as herein shown, and for the purpose described.

2. In combination with the curved tines A A', the toothed segments $a\,a'$, fixed to said tines, and arranged concentrically with the main pivot $b$, and used in connection with a suitable device for engaging or disengaging them at will, for the purpose specified.

The above specification of my invention signed by me, this 15th day of March, 1869.

C. E. WARNER.

Witnesses:
WM. J. DODGE,
F. A. MORLEY.